United States Patent [19]

Ryan

[11] Patent Number: 4,564,074

[45] Date of Patent: Jan. 14, 1986

[54] AGRICULTURAL IMPLEMENT

[76] Inventor: Austin T. Ryan, 19 Hewitt St., Warracknabeal, Victoria, Australia

[21] Appl. No.: 515,938

[22] Filed: Jul. 20, 1983

[30] Foreign Application Priority Data

Jul. 30, 1982 [AU] Australia .................. PF5141

[51] Int. Cl.⁴ .............................................. A01B 61/04
[52] U.S. Cl. .................... 172/265; 172/710
[58] Field of Search ............. 172/710, 705, 264, 265, 172/266, 267, 269, 270

[56] References Cited

U.S. PATENT DOCUMENTS

| | | | |
|---|---|---|---|
| 3,275,086 | 9/1966 | Morris | 172/266 |
| 3,365,002 | 1/1968 | Jacobs | 172/710 |
| 3,529,673 | 9/1970 | Morris | 172/710 X |
| 3,606,928 | 9/1971 | Quanbeck | 172/710 |
| 4,040,491 | 8/1977 | Dietrich | 172/266 |
| 4,116,281 | 9/1978 | Lant | 172/267 |

FOREIGN PATENT DOCUMENTS

| | | | |
|---|---|---|---|
| 207039 | 2/1956 | Australia | 172/265 |
| 731389 | 4/1966 | Canada | 172/267 |
| 840124 | 4/1970 | Canada | 172/264 |

Primary Examiner—Richard J. Johnson
Attorney, Agent, or Firm—Ladas & Parry

[57] ABSTRACT

An agricultural implement such as a cultivator includes a support body and a ground treatment tool depending from the support body for pivotal movement forwardly to and rearwardly from a work position.

Means is connected to the support body for biasing the tool to its work position. This biasing means and the ground treatment tool are pivotally coupled at spaced locations to a lever which slidably rests between such locations on a roller providing a fulcrum for the lever. As the tool retracts in response to a pre-determined resistance to its forward movement through or along the ground, it pulls the lever across and about the roller against the biasing means, resulting in relative movement of the fulcrum along the lever and consequent variation in the effective biasing force on the tool.

22 Claims, 7 Drawing Figures

AGRICULTURAL IMPLEMENT

This invention relates to an agricultural implement in which a ground treatment tool such as a tyne is biased to its work position but is retractable under a given resistive load. Such an arrangement is often referred to as a stump-jump mechanism. The invention has particular but not exclusive application to cultivators having spring loaded tynes. In a related aspect, the invention is directed to a mounting assembly for an agricultural implement.

The spring loading of cultivator tynes assists in reducing tyne breakages which otherwise can result when the tyne strikes a rock or stump in the ground. However, the clearance available to the tynes of many cultivators is often inadequate to prevent damage, especially if the tyne catches a rock and begins to roll it forwardly. Moreover, in the case of some machines, the location and direction of action of the spring connections to the tynes result in an inefficient use of the spring force: with many commercial cultivators, the loading force at the tip of the tyne is inadequate for difficult or comparatively freshly cleared ground, but the loading force after retraction of the tyne remains unnecessarily high and there is a severe reaction, or recoil shock, at the tyne mounting assembly which can result in damage to the assembly. For this reason, some manufacturers use an expensive spring-type tyne shank to absorb some of the shock on recoil. A still further disadvantage of most if not all prior cultivators of this type is that the returning tyne strikes a frame component with considerable force and noise: tynes are occasionally broken as a result, and repetitive such collisions cause damage to the frame.

In certain localities it has been found that the continual pounding of retracting and recoiling tynes in response to wide cracks every few inches in hard ground, causes severe damage, through transmitted shock, to tractor differentials, gear boxes and drives. This results in major expense and lost time for the farmer.

One known proposal for overcoming these difficulties has comprised a tyne arrangement in which retraction is possible when the resistive load on the tyne attains a threshold adequate to release a load responsive catch: once this occurs, the spring force on the tyne is much less than the threshold. This approach is considered to be less than satisfactory in view of the reliance upon a catch which might readily jam in harsh field conditions and since the residual loading force is not always sufficient to ensure a return of the tyne into the ground and resetting of the latch after the obstruction has been passed. In addition, there is no provision for slight vibration of the tynes as they work the ground: this is thought to be a necessary guard against short or highly localised strains.

It is accordingly an object of the invention to provide an agricultural implement such as a cultivator in which depending ground treatment tools are rendered responsive to excessive resistive loads in a manner which is an improvement on the aforedescribed arrangements.

It is a further object of the invention to provide a mounting assembly for an agricultural implement in which tool mounts forming part of the assembly are rendered responsive to excessive resistive loads in a manner which is an improvement on the aforedescribed arrangements.

The invention accordingly provides an agricultural implement comprising:

a support body;

a ground treatment tool mounted to and depending from said support body for pivotal movement forwardly to and rearwardly from a work position; and means connected to said body for biasing the tool to said work position;

wherein said biasing means and ground treatment element are pivotally coupled at spaced locations to a lever which slidably rests between said locations on roller means providing a fulcrum for the lever, the arrangement being such that, as the tool retracts in response to a pre-determined resistance to its forward movement through or along the ground, it pulls the lever across and about the roller means against the biasing means, resulting in relative movement of the fulcrum along the lever and consequent variation in the effective biasing force on the tool. Such variation preferably entails a substantial biasing force in the region of the work position, and a diminution of this force as the tyne retracts.

In an especially useful application of the invention, the agricultural implement is a cultivator in which the support body is an element of a metal frame provided with ground travel means such as ground wheels, and in which the ground treatment tool is a cultivator tyne. The biasing means is most conveniently one or more helical tension springs and there would be multiple tynes and biasing means, coupled as aforedescribed, arranged across the frame of the cultivator.

Preferably, the ground treatment tool includes a straight elongate segment arranged generally below and broadly parallel to the lever, such elongate segment being coupled to the lever by an arm hingedly attached to the segment and to the lever. The arm advantageously includes a recess which affords a seat for the roller means when the tool is in its work position.

By virtue of the aforesaid construction, it is possible to avoid or minimise shocks to the frame on return of the ground treatment tool to its work position. Further cushioning can be obtained by providing said recess with a ramp along which the roller means relatively moves to said seat under the action of the biasing means as the ground treatment tool reverts to its work position after returning past such position.

For facilitating replacement or exchange of the ground treatment tool, the latter may include a pair of elongate segments, one of which is separately pivotally coupled to the support body and to the biasing means while the other is detachably retained parallel to said one segment by means comprising a strap, through which the other segment is slidable, attached to said one segment, and a disengagable fastener spaced from the strap.

Advantageously, said lever includes an inclined portion along which the roller means moves during a latter part of said relative movement, whereby the biasing means falls towards the roller means to cause said diminution of said biasing force.

The invention also provides a tool mounting assembly for an agricultural implement comprising:

a support body;

a mount for a ground treatment tool, which mount is carried by and depends from said support body for privotal movement forwardly to and rearwardly from a normal position corresponding to a work position of any tool attached to the mount; and means connected to said body for biasing the mount to said normal position;

wherein said biasing means and mount are pivotally coupled at spaced locations to a lever which slidably rests between said locations on roller means providing a fulcrum for the lever, the arrangement being such that, as the ground treatment tool retracts in response to a pre-determined resistance to its forward movement through or along the ground, it and the mount pull the lever across and about the roller means against the biasing means, resulting in relative movement of the fulcrum along the lever and consequent variation in the effective biasing force on the mount.

The invention will now be further described, by way of example only, with reference to the accompanying drawings in which.

The illustrated tyne assembly is one unit 10 of a cultivator, not shown, which would typically have a plurality of like units securely fixed to the cross bars of a metal frame. One such cross bar is depicted in section at 12 in the drawings. The frame would typically include a draw-bar assembly (to the right of FIG. 2) for attachment of the cultivator behind a tractor, and ground travel means such as a pair of ground wheels. The ground wheels would conveniently be associated with level lift devices for adjusting the height of the frame with respect to the ground while maintaining it generally horizontal.

The tyne assembly includes a ground treatment tool, in this case a tyne 14 with curved shank 14a and a plowshare 13 at its tip, pivotally mounted below cross-bar 12, a pair of parallel helical compression springs 16 and 17, and a lever 18 connected to both the tyne 14 and springs 16, 17 to respective sides of a moveable fulcrum 21 afforded by a roller 20.

Figure 1:
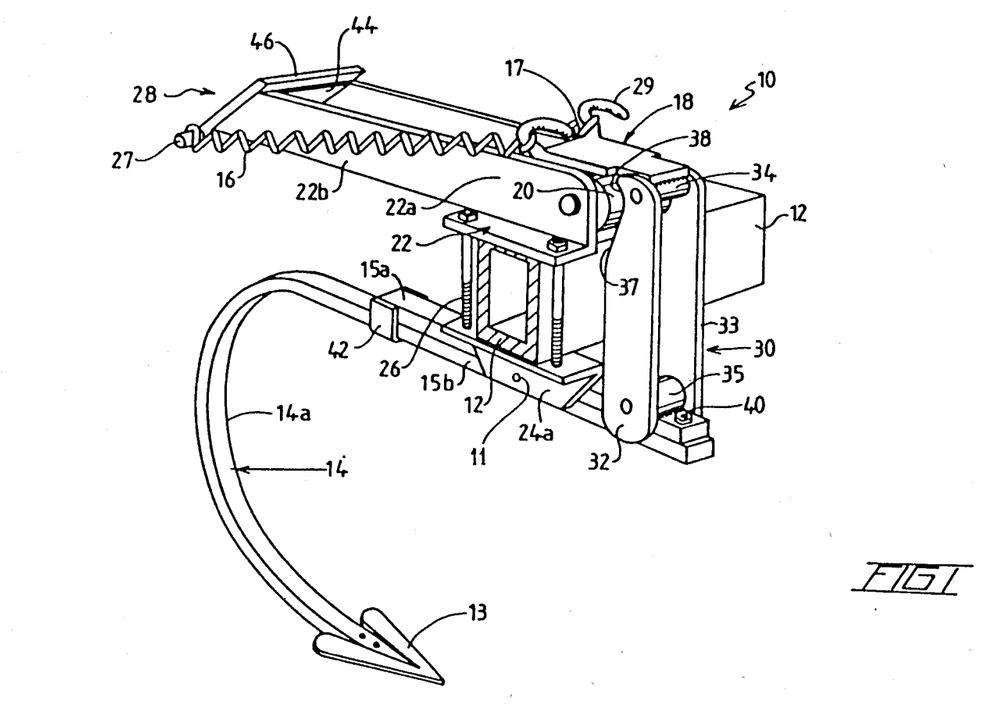
FIG. 1 is a perspective view of a tyne assembly forming an agricultural implement in accordance with the invention.

The support for the assembly comprises respective pairs of angle brackets 22,23 and 24,25 held in position above and below cross-bar 12 by four carriage bolts 26. The lower brackets 24, 25 define a pair of depending flanges 24a, 25a forming a recess which receives a straight elongate segment of tyne 14 comprising a beam 15a. Beam 15a is of rectangular cross-section and, in its normal position depicted in FIGS. 1 and 2, extends substantially horizontally. The beam is pivotally mounted at 11 to flanges 24a, 25a at about the mid-point of the beam, and centrally below cross-bar 12.

Matching and in underlying register with beam 15a is a second straight elongate segment 15b of tyne 14. Segment 15b is of like rectangular cross-section and is detachably supported from beam 15a by a forward bolt 40 and a rearward U-strap or bracket 42 dependent from the beam. Strap or bracket 42 encloses segment 15a in a tight but slidable fit below the beam, preferably defining an opening which substantially prevents wobble of the segment. It will be seen that the main portion of tyne 14 can be readily detached by releasing bolt 40 and drawing segment 15b rearwardly out of strap 42. In this way, the machine is rendered highly adaptable to replacement of worn tynes and/or to conversion for alternative operations.

Upper angle brackets 22, 23 define a pair of upstanding flanges 22a, 23a forming a recess at the forward end of which is rotatably mounted roller 20 so that the roller projects both a little above and a little forwardly of the flanges.

Springs 16, 17 extend at a shallow inclination between a pin 27 on a rearward fixed mount 28 at the ends of rearward extensions 22b, 23b of flanges 22a, 23a, and respective rear mounting hooks 29 on lever 18. Mount 28 comprises an inclined web 44 bridging the ends of flange extensions 22b, 23b, and a slotted plate 46 which is retained on web 44 by a bolt 48. Bolt 48 engages the slot in the plate, which is thereby adjustable in position, on loosening and then retightening the bolt, to adjust in turn the tension in the springs.

Lever 18 is a unitary forged plate comprising a forward flat portion 19a, a rearward downwardly convex portion 19b, and hooks 29.

Tyne 14 is hingedly connected to lever 18 in front of cross-bar 12 by a connecting arm 30 consisting of a pair of spaced tie plates 32, 33 between which are rotatably pinned spaced bosses 34, 35. Lever 18 is welded tangentially to upper boss 34 and beam 15a of tyne 14 is affixed to lower boss 35. A pair of upper recesses 38 on the rear edges of plates 32, 33 are positioned and dimensioned to neatly seat roller 20 when the plates are substantially upright. Recesses 38 include ramps 39 having a purpose to be further described.

Figures 2, 2A:
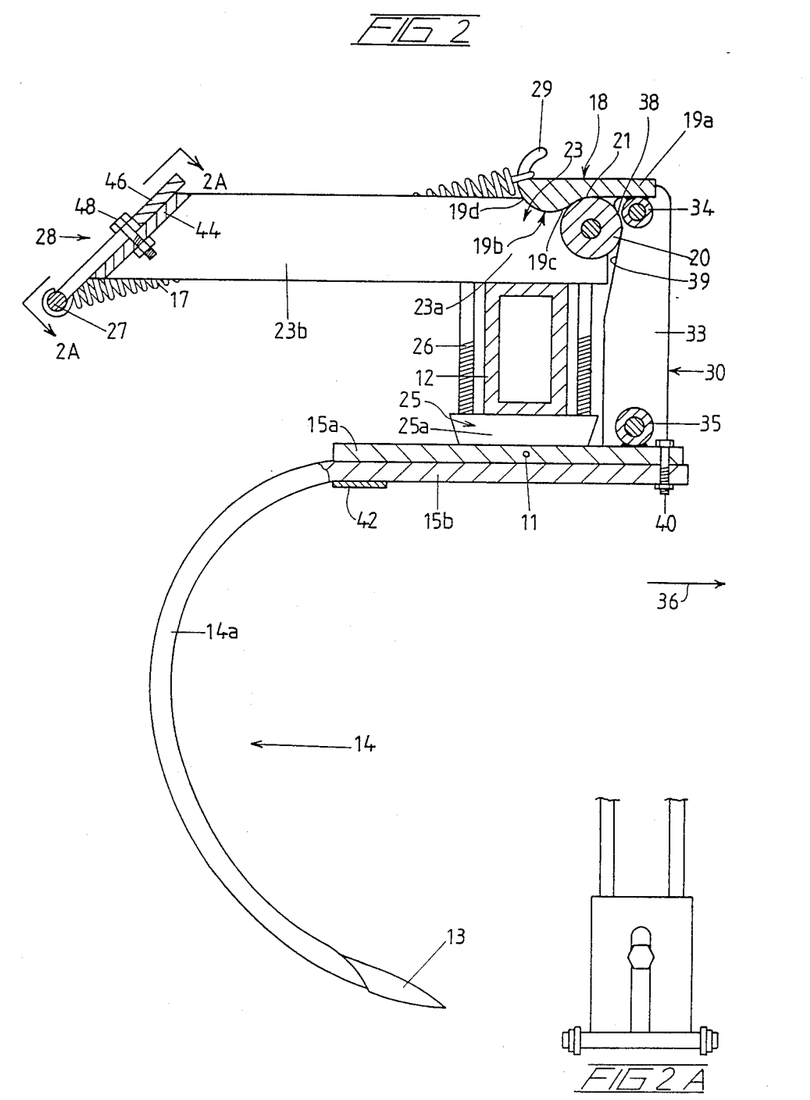
FIG. 2 is a longitudinal cross-section of the assembly showing the tyne in its work position.
FIG. 2A is a cross-section on the line 2A—2A in FIG. 2.

In use, the cultivator, of which the illustrated assembly forms one unit, is drawn forwardly by a tractor in the direction indicated by arrow 36 (FIG. 2). Tyne 14 adopts a work position approximating that shown in FIGS. 1 and 2, in which segment 15b and beam 15a are substantially horizontal, plates 32 and 33 are vertical, and recesses 38 seat roller 20 to locate and hold the work position. The work position is maintained by springs 16, 17 until a threshold resistive load is sensed at the forwardly travelling ploughshare 13. It will be noted that when the tyne is in the work position the lever fulcrum at 21 provided by roller 20 is relatively very close to connecting arm 30, thus amplifying the balancing force on tyne 18 about pivot 11. This allows a very substantial balancing load on the tyne without having to resort to very heavy and therefore expensive, springs. On the other hand, there is scope for slight vibration in the tynes in response to highly localised loads. It will also be noted that roller 20 seats on the front face 19c of convex portion 19b of lever 18.

Figure 3:
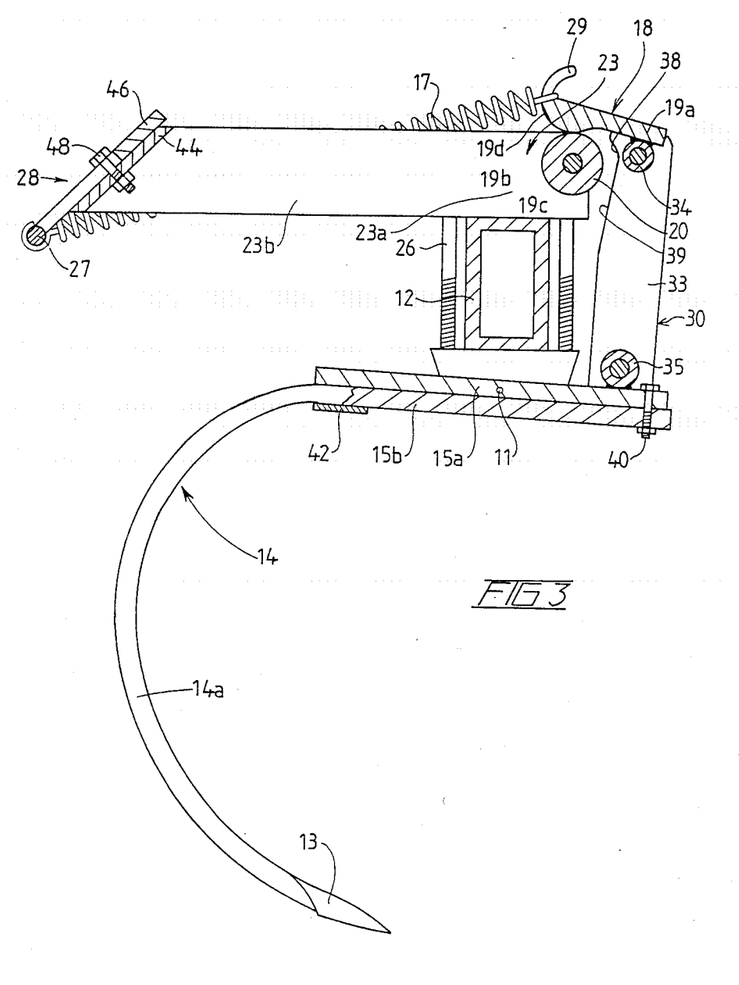
FIGS. 3 and 4 are views similar to FIG. 2 but depict the tyne in successive retracted positions, the work position of certain parts being shown in dot-dash lines.

When the resistive load does reach the threshold, such as when the tyne strikes a rock or stump in the ground being worked, the tyne begins to pivot its share rearwardly and therefore to pull down on arm 30. This in turn pulls lever 18, across and about roller 20 against the spring force, resulting in relative movement of the fulcrum along the lever. Such movement (FIG. 3) counters the effect of the increasing spring tension on arm 30 and yet does not, at first, seriously diminish it. In fact, because convex lever portion 19b must rise up onto roller 20 thereby extending springs 16, 17, there may be an initial net increase in the force at the tyne. This can be put to advantage in hard ground since it allows a certain amount of travel at moderate load, whereby the share will lie back slightly on hard ground and thereby be better positioned to bite, and penetrate, the ground.

Figure 4:
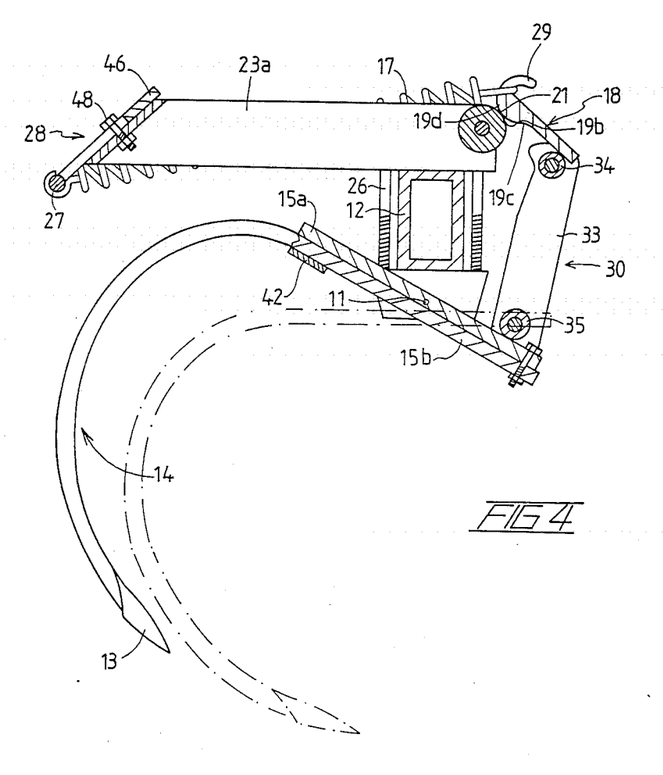

In due course, the forward face 19c of convex lever portion 19b will complete its traverse of roller 20 and the rearward inclined and curved face 19d will receive the roller (FIG. 4). Because of the slope there will result both a sudden slackening off of the spring, as hooks 29 and therefore springs 16, 17 drop towards roller 20 and their arc of travel is reduced, and a more rapid forward movement of the lever and retreat of the fulcrum, as the roller drops behind the convexity. Both these events will reduce the effective spring force transmitted by arm 30 to tyne 14, in contrast to the increasing biasing force which is found in most prior spring-loaded tyne assemblies. Spring travel and tension is reduced where it is not needed and it is thereby possible to use a less expensive spring system than in prior arrangements where spring travel and tension continually increased during retraction.

Once the tyne has cleared the obstruction, and is moved back towards its work by the spring, lever 18 will travel back across the roller to increase the effective loading force back towards the resistance threshold. This will ensure that the tyne returns into the ground, especially difficult ground, and is reset to the proper work position. On the other hand, the arrangement is such that the heavy body of the returning tyne no where strikes a part of the frame, thereby minimising noise and preventing repetitive shocks to the frame and tractor drive transmission components.

Figure 5:
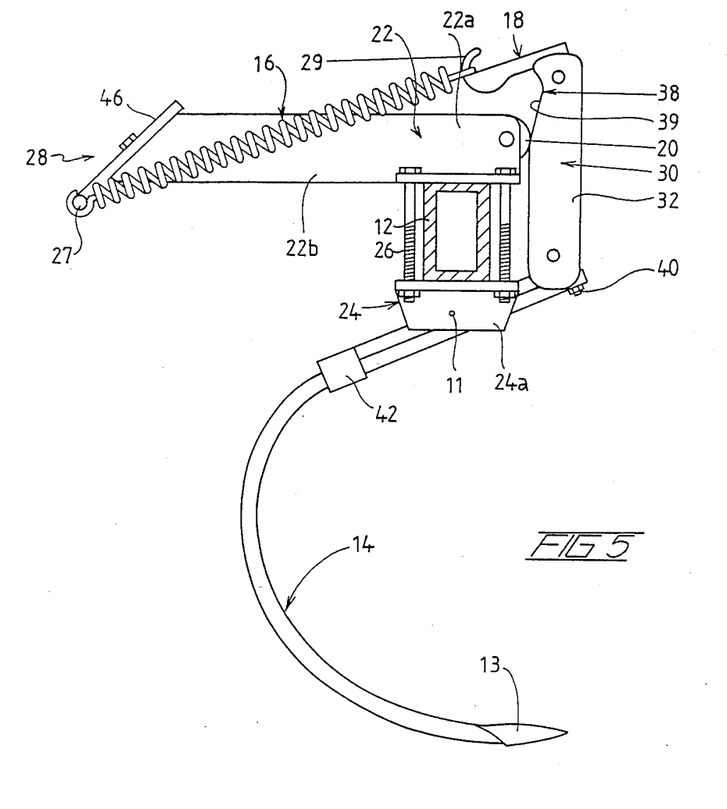
FIG. 5 is a side elevation showing the tyne when it has returned past its work position.

When the tyne arrives back at its work position it will have some momentum and can be expected to overshoot or kick forward. As this occurs (FIG. 5), plates 32, 33 will rise and lift recesses 38 above roller 20. However, the roller will engage and run down ramps 39 and the assembly will then be pulled back to the work position by the action of springs 16, 17, the roller moving gently back to its seats along ramps 39. The interaction thus between the roller and the ramps further facilitates the cushioning of tyne recoil shocks since a locating engagement is preserved without a potential for shock collision between the roller and the recesses.

Figure 6:
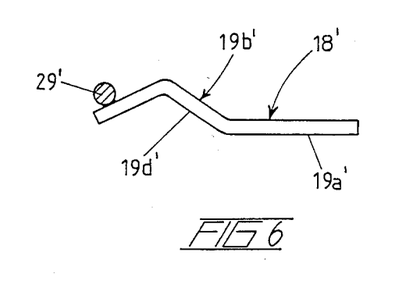
FIG. 6 is a side elevation of an alternative form of lever.

FIG. 6 depicts an alternative form of lever 18' having a spring mounting rod 29', a forward flat portion 19a', and a rearward concave portion 19b' providing an inclined face 19d' corresponding to face 19d of lever 18.

It will be appreciated that, with the arrangement of the invention, the tyne can retract to a very substantial height as the body of the tyne swings up behind flanges 24, 25 and thence into the space in front of cross-bar 12 below springs 16, 17, as illustrated in FIG. 4. The tyne can therefore clear a substantial obstruction without catching on the obstruction.

Another advantage in the illustrated construction relates to ease of assembly and repair. Springs 26, 17 can be fully tensioned by simply bringing plates 32, 33 up to beam 15a and applying the pin at boss 35. Conversely, spring tension is removed by taking out the the pin and leading plates 32, 33 forward by hand. By virtue of this facility, no spanners are required for final assembly and the tyne can be brought under full tension within seconds.

Two further consequences arise from the inventive mechanism. As well as requiring a lighter duty, less expensive spring system than prior mechanisms, there is also no need to employ spring-type tyne shanks to absorb recoil shocks. Moreover, it is feasible to employ tynes of an edge-on configuration: these have been recognized as preferable in some conditions to side-on tynes (the type illustrated in the appended drawings) because they collect less mud and give more trash clearance. However, in prior cultivators, it was found that edge-on tynes recoiled with such force that breakages and damage more than offset other advantages.

I claim:

1. An agricultural implement comprising:
   a support body;
   a ground treatment tool depending from said support body;
   means mounting said tool to said support body for pivotal movement upwardly and rearwardly from a work position;
   roller means mounted to said support body and located above said tool mounting means with its axis generally horizontal;
   a lever slidably resting on said roller means, said roller means providing a movable fulcrum for the lever;
   means pivotally coupling said tool and said lever forwardly of said mounting means and said roller means; and
   resilient biasing means connected between said support body and said lever, being connected to said lever behind the roller means and arranged to bias the tool to said work position;
   wherein as the tool retracts in response to a predetermined resistance to its forward movement through the ground, it pulls the lever across and about the roller means against the biasing means, resulting in relative movement of the fulcrum along the lever and consequent variation in the effective biasing force on the tool.

2. An agricultural implement according to claim 1 wherein the ground treatment tool includes a straight elongate segment arranged generally below and broadly parallel to the lever, and said coupling means includes an arm pivotally attached to the segment and to the lever.

3. An agricultural implement according to claim 2 wherein said lever includes an inclined portion along which the roller means moves during a latter part of said relative movement, whereby the biasing means falls towards the roller means to cause a diminution of said biasing force.

4. An agricultural implement according to claim 2 wherein said arm includes a recess which affords a seat for the roller means when the tool is in its work position.

5. An agricultural implement according to claim 3 wherein said recess includes a ramp along which the roller means relatively moves to said seat under the action of the biasing means as the ground treatment tool reverts to its work position after returning past such position.

6. An agricultural implement according to claim 2 wherein the lever and said elongate segment of the tyne extend generally horizontally and the arm substantially vertically.

7. An agricultural implement according to claim 2 wherein said arm comprises a pair of plates between which the lever and said segment are separately pinned.

8. An agricultural implement according to claim 1 wherein the ground treatment tool includes a pair of elongate segments, one of which is separately pivotally coupled to the support body and to the biasing means while the other is detachably retained parallel to said one segment by means comprising a strap, through which the other segment is slidable, attached to said one segment, and a disengagable fastener spaced from the strap.

9. An agricultural implement according to claim 1 wherein said lever includes an inclined portion along which the roller means moves during a latter part of said relative movement, whereby the biasing means falls towards the roller means to cause a diminution of said biasing force.

10. An agricultural implement according to claim 9 wherein said lever comprises a flat portion and a concave portion which successively traverse the roller means during retraction of the tool.

11. An agricultural implement according to claim 1 wherein the biasing means is a helical tension spring.

12. An agricultural implement according to claim 11 wherein the spring is connected to the support body by means adjustable to vary the tension of the spring.

13. An agricultural implement according to claim 1 comprising a cultivator in which the support body is an element of a metal frame provided with ground travel means, and in which the ground treatment tool is a cultivator tyne including a ploughshare at its tip.

14. An agricultural implement according to claim 13 in which the metal frame supports multiple tynes and biasing means coupled as aforesaid.

15. An agricultural implement according to claim 1 wherein the tool retracts in response to a predetermined resistance to its forward movement along the ground.

16. A tool mounting assembly comprising:
a support body;
a mount for a ground treatment tool;
means securing said mount said support body for pivotal movement to and from a normal position corresponding to a work position for any tool in said mount;
roller means mounted to said support body and located above said mount with its axis generally horizontal;
a lever slidably resting on said roller means, said roller means providing a movable fulcrum for the lever;
means pivotally coupling said mount and said lever forwardly of said securing means and said roller means; and
resilient biasing means connected between said support body and said lever, being connected to said lever behind the roller means and arranged to bias the mount to said normal position;
wherein as the tool retracts in response to a pre-determined resistance to its forward movement through the ground, it and the mount pull the lever across and about the roller means against the biasing means, resulting in relative movement of the fulcrum along the lever and consequent variation in the effective biasing force on the mount.

17. An agricultural implement according to claim 16 wherein the tool retracts in response to a predetermined resistance to its forward movement along the ground.

18. A tool mounting assembly according to claim 16 wherein the tool mount is straight and elongate, being arranged generally below and broadly parallel to the lever, such elongate segment being coupled to the lever by an arm hingedly attached to the tool mount and to the lever.

19. A tool mounting assembly implement according to claim 16 wherein said lever includes an inclined portion along which the roller means moves during a latter part of said relative movement, whereby the biasing means falls towards the roller means to cause a diminution of said biasing force.

20. A tool mounting assembly implement according to claim 18 wherein said arm includes a recess which affords a seat for the roller means when the tool is in its work position.

21. A tool mounting assembly implement according to claim 20 wherein said recess includes a ramp along which the roller means relatively moves to said seat under the action of the biasing means as the tool mount reverts to its normal position after returning past such position.

22. A tool mounting assembly implement according to claim 16 wherein said lever includes an inclined portion along which the roller means moves during a latter part of said relative movement, whereby the biasing means falls towards the roller means to cause a diminution of said biasing force.

* * * * *